United States Patent
Filippov et al.

(10) Patent No.: US 8,074,474 B2
(45) Date of Patent: Dec. 13, 2011

(54) FIBER AIR TURN FOR LOW ATTENUATION FIBER

(75) Inventors: Andrey V Filippov, Painted Post, NY (US); Hazel B Matthews, III, Wilmington, NC (US); Bruce Warren Reding, Wilmington, NC (US); Bradley K Shepard, Wilmington, NC (US); David Andrew Tucker, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 708 days.

(21) Appl. No.: 11/998,366

(22) Filed: Nov. 29, 2007

(65) Prior Publication Data

US 2009/0139270 A1    Jun. 4, 2009

(51) Int. Cl.
*C03B 37/02* (2006.01)

(52) U.S. Cl. ............. 65/384; 65/434; 65/435; 65/488; 65/510; 65/533

(58) Field of Classification Search .............. 65/384, 65/434, 435, 488, 510, 533
See application file for complete search history.

(56) References Cited

U.S. PATENT DOCUMENTS

| | | | |
|---|---|---|---|
| 3,782,914 A | 1/1974 | DeLuca et al. | 65/3 |
| 3,788,827 A | 1/1974 | DeLuca | 65/30 |
| 3,881,902 A | 5/1975 | DeLuca | 65/12 |
| 3,881,945 A | 5/1975 | Trojer et al. | 106/50 |
| 3,988,274 A | 10/1976 | Masuhara et al. | 260/29.7 |
| 4,154,592 A | 5/1979 | Bailey | 65/2 |
| 4,199,336 A | 4/1980 | Rittler | 65/2 |
| 4,304,582 A | 12/1981 | Aussenegg et al. | 65/12 |
| 4,309,201 A | 1/1982 | Klop et al. | 65/2 |
| 4,396,409 A | 8/1983 | Bailey et al. | 65/3.11 |
| 4,659,354 A | 4/1987 | Roba | 65/3.12 |
| 4,673,427 A | 6/1987 | Van Der Giessen et al. | 65/424 |
| 4,874,415 A | 10/1989 | Boniort et al. | 65/3.11 |
| 4,889,546 A | 12/1989 | Denniston | 65/5 |
| 5,042,899 A | 8/1991 | Le Compte | 385/134 |
| 5,059,229 A | 10/1991 | Blankenship et al. | 65/2 |
| 5,284,499 A | 2/1994 | Harvey et al. | 65/3.11 |
| 5,314,515 A | 5/1994 | Cain | 65/3.11 |
| 5,320,658 A | 6/1994 | Ohga et al. | 65/3.11 |
| 5,897,681 A | 4/1999 | Lysson et al. | 65/435 |

(Continued)

FOREIGN PATENT DOCUMENTS

DE    37 07 969 A1    9/1988

(Continued)

OTHER PUBLICATIONS

Abstract of Japan JP60-186430; Yoshinori et al; Nippon Telegr & Teleph Corp; Jan. 27, 1984.

(Continued)

*Primary Examiner* — Queenie Dehghan
(74) *Attorney, Agent, or Firm* — Matthew J. Mason

(57) ABSTRACT

A method for forming an optical fiber includes drawing the optical fiber from a glass supply and treating the fiber by maintaining the optical fiber in a treatment zone wherein the fiber is cooled at a specified cooling rate. The optical fiber treatment reduces the tendency of the optical fiber to increase in attenuation due to Rayleigh scattering, and/or over time following formation of the optical fiber due to heat aging. Methods for producing optical fibers along nonlinear paths incorporating fluid bearings are also provided thereby allowing for increased vertical space for the fiber treatment zone.

13 Claims, 5 Drawing Sheets

U.S. PATENT DOCUMENTS

| | | | |
|---|---|---|---|
| 5,928,574 A | 7/1999 | Di Marcello et al. | 264/1.29 |
| 6,565,775 B2 | 5/2003 | Dubois et al. | 264/1.24 |
| 6,576,164 B2 | 6/2003 | Guenot et al. | 264/1.24 |
| 7,565,820 B2 * | 7/2009 | Foster et al. | 65/384 |
| 2001/0005993 A1 | 7/2001 | Guenot et al. | 65/434 |
| 2001/0006262 A1 | 7/2001 | Dubois et al. | 264/1.24 |
| 2002/0059816 A1 | 5/2002 | Nagayama et al. | 65/435 |
| 2002/0194881 A1 | 12/2002 | Nagayama et al. | 65/424 |
| 2003/0041628 A1 | 3/2003 | Bird et al. | 65/533 |
| 2003/0086670 A1 | 5/2003 | Moridaira et al. | 385/123 |
| 2003/0126890 A1 | 7/2003 | Orita et al. | 65/432 |
| 2003/0200772 A1 | 10/2003 | Foster et al. | 65/424 |
| 2004/0013336 A1 | 1/2004 | Foster et al. | 385/4 |
| 2005/0042559 A1 | 2/2005 | Bird et al. | 431/8 |
| 2007/0022786 A1 | 2/2007 | Foster et al. | 65/384 |

FOREIGN PATENT DOCUMENTS

| | | |
|---|---|---|
| DE | 37 13 029 | 11/1988 |
| EP | 0 321 182 | 12/1988 |
| EP | 0493679 A2 | 7/1992 |
| EP | 1 191 367 A2 | 3/2002 |
| EP | 1 281 988 | 5/2002 |
| JP | 52-115231 | 9/1977 |
| JP | 59-146948 | 2/1983 |
| JP | 58-204834 | 11/1983 |
| JP | 60-103052 | 6/1985 |
| JP | 62-3037 | 6/1985 |
| JP | 60-186430 | 9/1985 |
| JP | 20-74542 | 3/1990 |
| JP | 04-265254 | 2/1991 |
| JP | 9-142890 | 6/1997 |
| JP | 10-194770 | 7/1998 |
| JP | 10-218635 | 8/1998 |
| JP | 2001-141583 | 11/1999 |
| JP | 2000-128566 | 5/2000 |
| WO | WO 99/65834 | 12/1999 |
| WO | WO 00/73223 | 12/2000 |
| WO | WO 00/73224 | 12/2000 |
| WO | WO 01/27045 | 4/2001 |
| WO | WO2008/066661 | 6/2008 |

OTHER PUBLICATIONS

Patent Abstract of Japan, 6-211535; Nobuaki; Furukawa Electric co. Ltd.; Aug. 2, 1994.

Patent Abstract of Japan, 63-129035; Kazuo et al.; Fujikura Ltd., Nov. 17, 1986.

Patent Abstract of Japan, 11-116264; Takeshi, et al; Hitachi Cable ltd., Oct. 15, 1997.

Patent Abstracts of Japan, 60-221337; Kazuo et al.; Fujikura Ltd, Nov. 6, 1985.

K. Tsujikawa et al., "Rayleigh Scattering Reduction Method for Silica-Based Optica Fiber", Journal of Lightwave Technology, vol. 18, No. 11, Nov. 2000, pp. 1528-1532.

Abstract of Japan JP58-204834; Kenzo et al.; Hitachi Ltd, et al; May 26, 1982.

Abstract of Japan JP52-115231; Naoya et al.; Nippon Telegr & Teleph Corp; Mar. 24, 1976.

Abstract of Japan JP60-103052; Osamu; Hitachi Densen KK; Jun. 7, 1985.

Abstract of Japan JP20-74542; Yoichi, et al; Sumitomo Electric Ind. Ltd; Mar. 14, 1990.

Abstract of Japan JP10-194770; Toshiaki; Kobe Steel Ltd.; Dec. 27, 1996.

* cited by examiner

FIBER AIR TURN FOR LOW ATTENUATION FIBER

BACKGROUND OF THE INVENTION

1. Field of the Invention

The present invention relates to methods and apparatus for forming optical fiber and more particularly, to methods and apparatus for forming optical fiber having improved characteristics.

2. Technical Background

Attenuation and sensitivity to heat (or thermal) aging may be critical attributes of optical fibers, particularly for high data rate optical fibers. In making optical fibers, it may be necessary or desirable to minimize attenuation loss in the intended window of operation for the fiber. Attenuation in an optical fiber can increase after fabrication of the fiber because of a phenomenon called "heat aging." Heat aging is the tendency of some optical fibers to increase in attenuation over time following formation of the fibers due to temperature fluctuations in the fiber's environment. Typically, the attenuation change from heat aging may be apparent at approximately 1200 nanometers (nm) with increasing effect up to about 1700 nm in a spectral attenuation plot. Furthermore, attenuation may be the result of Rayleigh scattering loss. Therefore, improved methods that reduce fiber attenuation due to effects such as heat aging and Rayleigh scattering are desired.

One method for manufacturing fibers that have reduced attenuation due to effects such as heat aging and Rayleigh scattering involves cooling fiber at a controlled rate while drawing fiber from a draw furnace apparatus. However, cooling fiber at a controlled rate can be difficult to achieve in conventional processes for manufacturing optical fibers. Such processes generally involve the vertical downward draw of fiber along a linear pathway along which there is typically little space available for adding additional equipment, such as equipment for cooling fiber at a controlled rate, without adding height to the overall system. Because adding height to an existing system can add significant cost to the system, processing systems in which space is available for controlled cooling without necessitating an increase in overall system height are desired.

SUMMARY OF THE INVENTION

One aspect of the invention includes a method for producing an optical fiber that includes drawing the fiber from a heated glass source, treating the optical fiber by maintaining the optical fiber in a treatment zone, while subjecting the optical fiber to an average cooling rate in the treatment zone defined as a fiber entry surface temperature minus a fiber exit surface temperature divided by the total residence time of the optical fiber in the treatment zone of less than 5,000° C./s, such as less than 2,500° C./s, including less than 1,000° C./s, wherein the temperature of the fiber exiting the treatment zone is at least about 1,000° C.

In at least one embodiment, the length of the treatment zone is at least about 3.5 meters, such as at least about 5 meters, including at least about 10 meters.

In at least one embodiment, the total residence time of the fiber in the treatment zone is greater than 0.25 seconds.

In at least one embodiment, the fiber is drawn at a draw speed of greater than or equal to 10 m/s, such as greater than or equal to 20 m/s, including greater than or equal to 30 m/s.

In at least one embodiment, the fiber is drawn at a draw tension of between about 25 and 200 grams, such as between about 60 and 170 grams.

In at least one embodiment, the surface temperature of the optical fiber entering the treatment zone is from about, 1,300° C. to about 2,000° C., such as from about 1,550° C. to about 1,750° C., and the surface temperature of the optical fiber exiting the treatment zone is at least about 1,250° C. to about 1,450° C.

A further aspect of the invention includes treating bare optical fiber in a treatment zone along a first pathway and then contacting the bare optical fiber with a region of fluid in a fluid bearing, the fluid bearing including a channel, the channel defined by at least two sidewalls, and the fiber being retained within a region of the channel that is sufficient to cause the fiber to be levitated within the channel substantially as a result of a pressure differential that is present below the fiber within the channel. The pressure differential is caused by a higher pressure caused by the fluid being supplied below the fiber within the channel compared to the pressure that is above the fiber. The fiber is redirected along a second pathway as the bare optical fiber is drawn across the region of fluid cushion.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
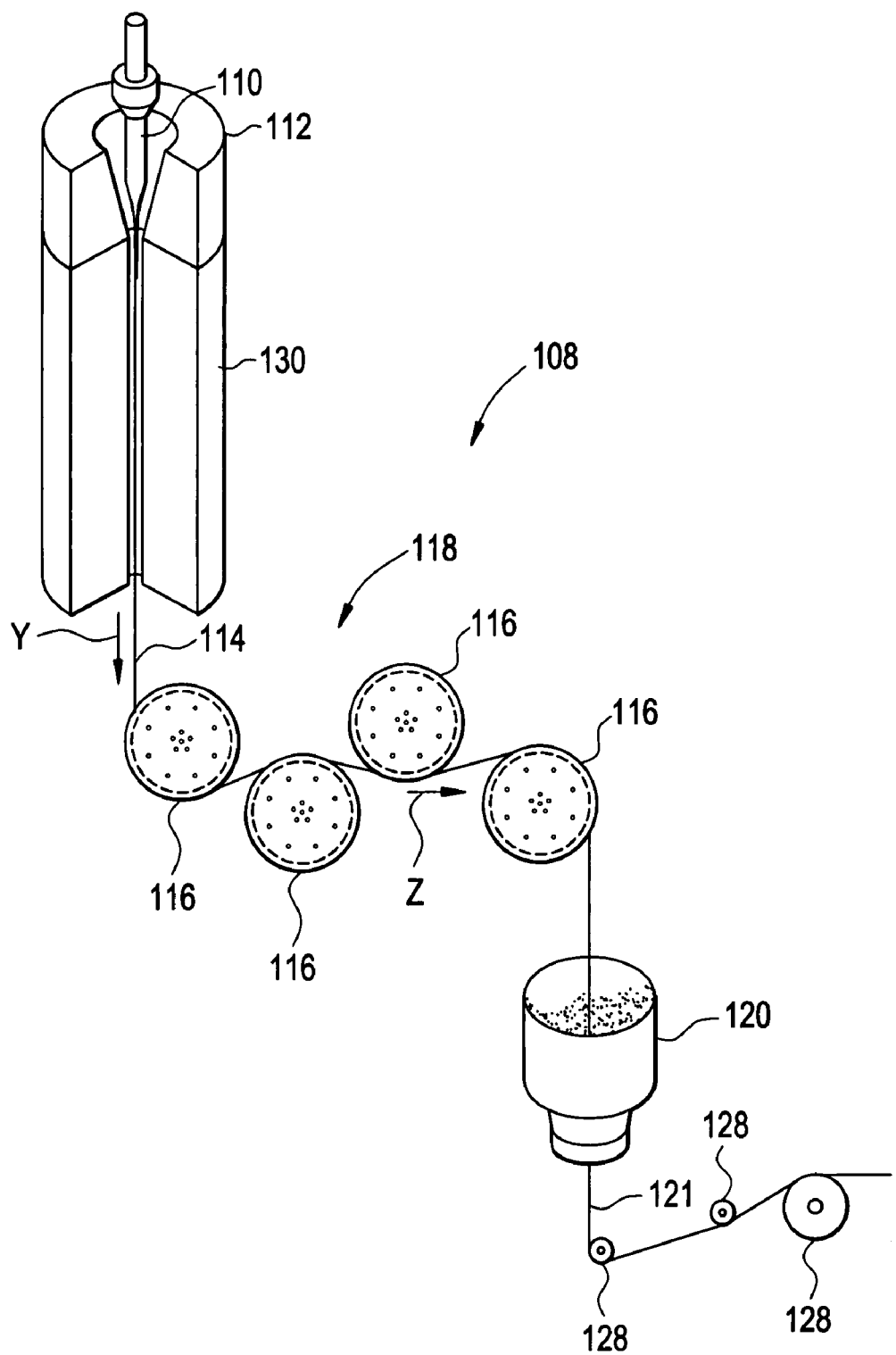
FIG. 1 illustrates an optical fiber production system.

Reference will now be made in detail to the present preferred embodiment(s) of the invention, examples of which are illustrated in the accompanying drawings.

The present invention provides methods and apparatus for forming an optical fiber, such as a doped optical fiber. As optical fiber is drawn from an optical fiber preform at certain draw speeds and draw tensions, undesirable defects such as heat aging defects are induced into the optical fiber. Likewise, certain draw conditions produce more micro-scale density variations that lead to increased Rayleigh scattering. To combat these defects, the optical fiber is treated in accordance with the invention by maintaining the optical fiber within a treatment temperature range for a treatment time. In particular, it is desired to subject the optical fiber, as drawn, to a specified cooling rate. The phenomena of heat aging is best minimized by performing slowed cooling, preferably, while maintaining the optical fiber within a treatment tension range. Likewise, the phenomena of Rayleigh back scattering is reduced by subjecting the fiber to a specified cooling rate. Thus, advantageously, the invention herein can reduce the tendency of the optical fiber to increase in attenuation over time following formation of the optical fiber, i.e., it can reduce the so-called heat aging effect. Further, the invention herein can further decrease the micro-density variations that contribute to Rayleigh scattering and therefore can reduce the attenuation of the optical fiber.

The glass preform, and thus the optical fiber, may be doped with at least one dopant such as germanium, fluorine, phosphorous, chlorine or combinations thereof. In particular, certain fiber refractive index profiles are found by the inventors to be more susceptible to heat aging, for example, fibers with high amounts of dopants are found to be very susceptible. All refractive index profiles exhibit attenuation from Rayleigh scattering.

In the various embodiments, the optical fiber is drawn from a draw furnace and into a treatment zone.

As used herein, the term "treatment zone" refers to an area downstream from a draw furnace where optical fiber is cooled at a rate that is slower than the cooling rate of the fiber in air at room temperature (i.e., air at about 25° C.) when the surface temperature of the fiber exiting the treatment zone is at least about 1,000° C. In a preferred embodiment, the average cooling rate of the fiber in the treatment zone may be less than 5,000° C./s, including less than 2,500° C./s, and further including less than 1,000° C./s, when the temperature of the fiber is at least 1,000° C., such as when the temperature of the fiber is between 1,250° C. and 1,750° C.

The average cooling rate of the fiber in the treatment zone is defined as the fiber surface temperature at the entry point of the fiber into the treatment zone (the fiber entry surface temperature) minus the fiber's surface temperature at an exit point of the fiber out of the treatment zone (the fiber exit surface temperature) divided by the total residence time of the fiber in the treatment zone.

In at least one embodiment, the treatment zone includes a treatment furnace. In one embodiment, the treatment furnace is disposed substantially immediately downstream from the draw furnace although the invention is not limited to embodiments where the treatment furnace is disposed substantially immediately downstream from the draw furnace. In a preferred embodiment, the treatment furnace is attached directly to the end of the draw furnace at a location where the fiber exits therefrom such that a seal is preferably formed therebetween. This minimizes unwanted entry of air into the draw furnace.

In further embodiments, the optical fiber is drawn from a draw furnace such that the drawn fiber is initially surrounded by a first gas. The drawn optical fiber may be treated by passing the drawn optical fiber through a passage or chamber of the passive treatment assembly. The passage or chamber preferably contains a second gas having a lower thermal conductivity than the first gas. Preferably, the gases mix and are discharged out of the end of the passive muffle.

According to one embodiment of the invention, the cooling rate of the fiber within the chamber containing the second gas is controlled thereby minimizing the induced heat aging effect. It has been found that a cooling rate of between 840° C./s and 4000° C./s between the temperature range of between about 1100° C. to about 1500° C. can be desirable for controlling heat aging of the fiber.

According to further embodiments of the invention, a method of manufacturing an optical fiber at high speed is provided that comprises the steps of drawing the optical fiber from a heated glass supply, such as optical fiber preform, at a draw rate of greater than or equal to 10 m/s, preferably greater than or equal to 20 m/s, and even more preferably greater than or equal to 30 m/s, followed by heat treating the optical fiber by maintaining the optical fiber in a treatment zone while subjecting the optical fiber to an average cooling rate in the treatment zone of less than 5,000° C./s, such as an average cooling rate of between 500° C./s and 5,000° C./s, including an average cooling rate of between 500° C./s and 2,500° C./s, and further including an average cooling rate of between 500° C./s and 1,000° C./s.

To achieve the foregoing, one embodiment of the present invention includes a method for producing an optical fiber including drawing the fiber from a heated glass source, treating the fiber in a treatment zone along a first pathway, and contacting the bare optical fiber with a region of fluid cushion of a fluid bearing and redirecting the bare optical fiber along at least a second pathway as the bare optical fiber is drawn across the region of fluid cushion.

The present invention includes methods for treating and for forming and treating drawn optical fibers to reduce the heat aging sensitivity (defects) of the treated optical fibers. As used herein, "heat aging" means a defect in the optical fiber that causes attenuation in the fiber to increase over time subsequent to the initial formation of the fiber. As will be better understood from the description that follows, the methods and apparatus of the present invention may allow for relatively high speed, high tension formation of drawn, doped, optical glass fibers having reduced heat aging sensitivity as compared to like fibers which have been drawn at such speeds and tensions but without the treatment step of the present invention.

The phrase "bare optical fiber" as used herein means an optical fiber directly drawn from a preform and prior to applying a protective coating layer to its outer surface (e.g., prior to the bare optical fiber being coated with a polymeric based material). The present invention provides flexibility by allowing the optical fiber to be transported along nonlinear pathways through stages of production prior to a protective coating being applied thereto. In addition, as discussed later herein, systems and methods of the invention not only provide nonlinear pathways, but can also assist in processing (e.g., cooling) of the optical fiber during production.

Referring to FIG. 1, an example of the system 108 for producing optical fibers is illustrated. In the embodiment shown in FIG. 1, a preform 110 is placed in a furnace 112 and fiber is drawn therefrom to create a bare optical fiber 114. Preform 110 may be constructed of any glass or material suitable for the manufacture of optical fibers. Once bare optical fiber 114 is drawn from a preform 110 and leaves furnace 112, the bare optical fiber 114 enters a treatment zone 130 that allows for the fiber to be cooled at a controlled rate. Once the bare optical fiber 114 leaves the treatment zone 130, the bare optical fiber contacts at least one stationary fluid bearing 116 (shown in FIG. 1 as a plurality of fluid bearings) and shifts from moving along a substantially first or vertical pathway (Y) to second pathway (Z). As illustrated, second pathway (Z) is oriented horizontally or orthogonal to the first path, but it should be understood that systems and methods described herein can redirect an optical fiber along any nonlinear pathway prior to a protective coating being applied thereto.

In the embodiment illustrated in FIG. 1, optical fiber 114 passes through fluid bearings 116 and is subjected to a coating unit 120 where a primary protective coating layer 121 is applied to the outer surface of the bare optical fiber 114. After leaving the coating unit 120, the optical fiber with protective layer 121 (no longer being bare) can go through a variety of other processing stages within the system (not shown). Drawing mechanisms 128 are used to provide the necessary tension on the optical fiber as it is drawn throughout the entire system as shown in FIG. 1 and eventually wound onto a fiber storage spool (not shown).

As the optical fiber 114 is transported over the fluid bearings 116 (described later herein), the region of fluid cushion on each fluid bearing 116 cools the bare optical fiber 114. For example, referring to FIG. 1, the optical fiber 114 exiting the treatment zone 130 can have a temperature of around 500° C.-1500° C. as it enters the fluid bearings 116. In some preferred embodiments, the optical fiber enters the fluid bearings 116 at a point where the fiber temperature is less than 1,300° C., more preferably less than 1,200° C., and in some embodiments less than 1,100° C. Because the fluid bearing employs a moving fluid stream which supports the optical fiber, the optical fiber is cooled at a rate which is faster than the fiber would cool in non-moving air at room temperature, such as is present immediately outside the draw furnace. The greater the temperature differential between the optical fiber and the fluid in the fluid bearing (which is preferably room temperature air), the greater the ability of the fluid bearing to cool the optical fiber 114. In another embodiment, the fluid emitted through the fluid bearings 116 can actually be cooled so as to cool the optical fiber at an even faster rate. The fluid associated with the region of fluid cushion can provide sufficient cooling to the optical fiber 114 so that it can be directly transported to the coating unit 120 and a protective layer can be applied to the outer surface of the bare optical fiber 114 to produce a coated fiber 121. In one embodiment, the region of fluid cushion of the fluid bearing 116 can include a fluid that is nonreactive relative to the bare optical fiber 114 (e.g., air, helium).

In addition to providing cooling, the arrangement of FIG. 1 utilizing multiple fluid bearings 116 can provide better stability when shifting the bare optical fiber 114 from a substantially linear arrangement (Y) to a substantially nonlinear arrangement (Y+Z). Without intending to be limited by theory, by having multiple fluid bearings 116 arranged adjacent to each other, the precision required to have the optical fiber 114 move from one region of fluid cushion to the next can be more easily controlled. Of course, it should be understood that any number of bearing assemblies (discussed later herein), including one bearing assembly, arranged in any order and to provide any number of desired pathways can be used to produce optical fibers.

Figure 2:
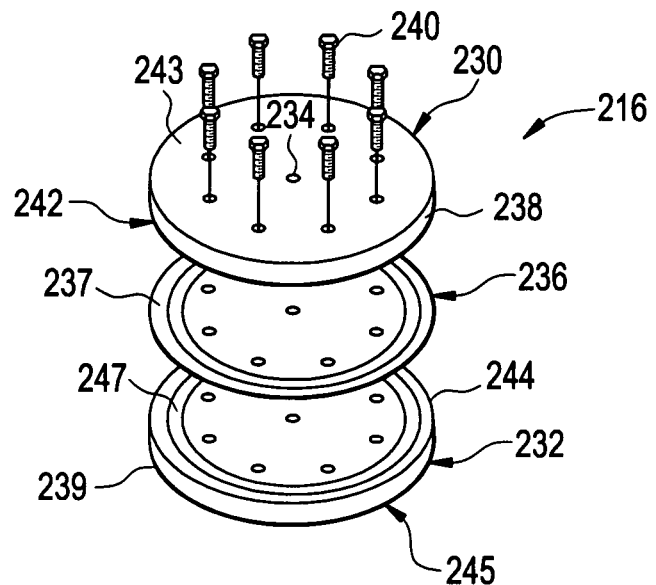
FIG. 2 illustrates an exploded view of a fluid bearing for use in an optical fiber production system.

Heretofore, systems and methods for producing optical fibers in nonlinear pathways have been described. As described herein, such systems and methods can include incorporation of one or more bearing assemblies. FIG. 2 illustrates an embodiment of a bearing assembly 216 that can be used for producing an optical fiber as described herein. In the embodiment shown in FIG. 2, the bearing assembly 216 (referred to sometimes as "fluid bearing") includes a first plate 230, a second plate 232, an inner member 236 and at least one opening 234 in at least one of the first and second plates. The first plate 230 and the second plate 232 can be made of metal and include an arcuate outer surface 238, 239 and can be positioned on opposite sides of each other. The first plate 230 and the second plate 232 are connected by fasteners (e.g., bolts 240) to link the plates 230, 232 together so that fluid may be passed through the bearing assembly 216. The arcuate outer surfaces 238, 239 of each plate 230, 232 generally lie along the circumference of each of the respective plates 230, 232. The first plate 230 and the second plate 232 each have respective inner 242, 244 and outer faces 243, 245, wherein the inner faces 242, 244 of the plates 230, 232 are aligned with each other. A recessed portion 247 extends at least partially around the inner faces 242, 244 of either the first plate 230 or the second plate 232 to provide a plenum for fluid flow. In another embodiment, the recessed portion may comprise a variety of configurations to provide uniform flow into fiber support channel 250, as discussed later herein.

In the embodiment illustrated, the arcuate outer surfaces 238, 239 of the first plate 230 and the second plate 232 are preferably substantially aligned and form a region between the outer surfaces 238, 239 of both the first plate 230 and the second plate 232. This region is configured to receive an optical fiber so that optical fiber can travel along this region without rotation of the bearing assembly. This fiber support channel 250 is more clearly illustrated in the embodiment shown in FIG. 3 (discussed later herein). At least one opening 234 passes through at least one of the first plate 230 and the second plate 232. As shown in FIG. 2, the opening 234 of the first plate 230 and the second plate 232 allow for fluid (e.g., air, helium or other desired gas or liquid) to be fed through the bearing assembly 216 so that the fluid can exit the bearing assembly 216 at the fiber support channel 250 which is formed between the first plate 230 and the second plate 232.

In addition, as shown in the embodiment of FIG. 2, the bearing assembly 216 can include an inner member 236 positioned between the first plate 230 and the second plate 232. This inner member 236 (e.g., a shim 237) is configured to aid in directing the fluid to the region between the outer surfaces 238, 239 of the first plate 230 and the second plate 232 such that the fluid exits the fiber support channel 250 having a predetermined flow direction. The inner member 236 rests between the first plate 230 and second plate 232 to provide a gap there between. The inner member 236 directs the fluid such that it exits the fiber support channel 250 having a predetermined flow direction. If desired, inner member 236 can comprise a plurality of fingers (not shown) to further control fluid flow by suppressing non-radial flow. In addition, the inner member 236 serves as a sealing portion to provide substantial contact between the first plate 230 and the second plate 232. Inner member may also include notches to facilitate entry and exit of the optical fiber.

Figure 3:
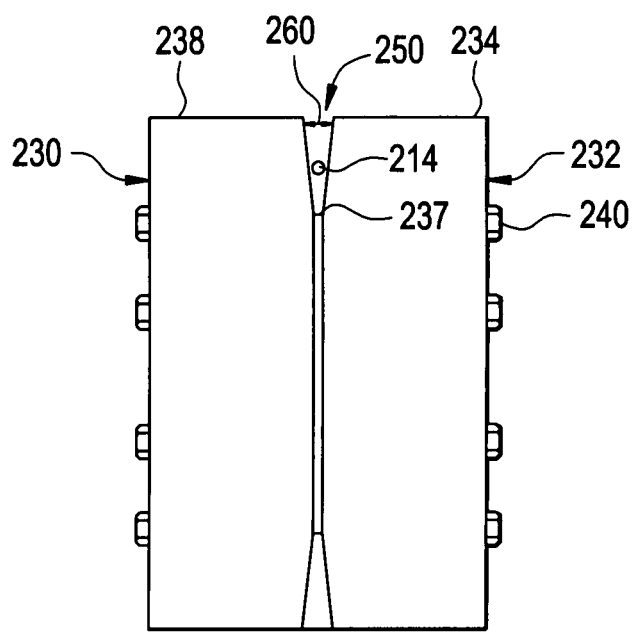
FIG. 3 illustrates a side plain view of a fluid bearing having a tapered region for an optical fiber production system.

As shown in FIG. 3, the fiber support channel 250 formed between the outer surfaces 238, 239 of the first plate 230 and the second plate 232 can be tapered where the fluid exits between the first plate 230 and the second plate 232. In another embodiment however, fiber support channel 250 can include a parallel or reverse tapered shape, for example. In addition, the opening 260 within the tapered fiber support channel 250 is variable depending on where the optical fiber 214 is vertically positioned. Preferably, the opening 260 and the fiber support channel 250 is configured so that, for the particular draw tensions and draw speeds employed and flow rates of the fluid through the opening 260, the optical fiber is maintained in a section of fiber support channel 250 which is less than 500, more preferably less than 400, even more preferably 300, and most preferably less than 200 microns wide, for a fiber having a typical outer diameter of 125 microns. Thus, the fiber is preferably retained within a region of the channel 250 which is between 1 and 2 times the diameter of the fiber, more preferably between 1 and 1.75 times the diameter of the fiber, and most preferably between 1 and 1.5 times the diameter of the fiber. Preferably, the fiber is located within a region of said channel such that the distance between the outer fiber and each wall is between 0.05 and 0.5 times the fiber diameter.

In the embodiment illustrated, for ease of viewing, the tapered angle has been exaggerated in the illustration from what is a preferred angle of taper opening to fiber support channel 250. In reality, at least one of and preferably both of the opposing surfaces of support channel 250 are each inclined, preferably at an angle greater than 0 and less than 10 degrees, more preferably between 0.3 and 7 degrees, and most preferably between 0.4 and 3 degrees, so that the width 260 of the top or outer portion of fiber support channel 250 is wider than the width 260 of the bottom or inner portion 237 of fiber support channel 250. For example, in such an embodiment, the first plate 230 and the second plate 232 forming the region may be inclined at an angle of −0.6° and +0.6°, respectively. Alternatively, fiber support channel 250 may comprise any depth, width or tapered angle. By utilizing a tapered fiber support channel 250 and injecting the fluid into the slot formed by fiber support channel 250 so that the fluid enters the narrower inner portion of fiber support channel 250 and exits the wider outer region of fiber support channel 250, the cushion of fluid emitted through channel 250 will cause the fiber to be self locating within the depth of the channel 250. For example, for a given fluid flow, if the fiber draw tension is increased, the fiber will move downward in the channel 250 until the gaps between the fiber 214 and channel walls are small enough that the pressure in region 237 is high enough to correctly counteract the new higher tension. If the fiber draw tension is decreased, the fiber will move upwardly within the channel 250 until the gaps between fiber 214 and channel walls are large enough that the pressure in region 237 is small enough to correctly counteract the new, lower tension. Tapering the channel 250 thus enables the channel 250 to work with a wider range of draw tensions. Otherwise, if channel 250 as shown was not tapered and the draw tension was decreased, the fiber would travel upward and out of fiber support channel 250.

Preferably, the fiber is located in an area of the channel 250 that is between about 1 and 2 times the fiber diameter, more preferably between about 1 and 1.75 times the fiber diameter, most preferably between about 1 and 1.5 times the fiber diameter. By locating the fiber in such a relatively narrow region in channel 250, the fiber will center itself during operation due to the Bernoulli effect. For example as the fiber gets closer to either opposing surface of channel 250, the velocity of the air will increase nearest one surface and decrease nearest the other. According to the Bernoulli effect, an increase in fluid velocity occurs simultaneously with a decrease in pressure. As a result, the greater pressure caused by the decreased fluid flow near one surface will force the fiber back into the center of channel 250. Thus, in the preferred embodiments, the fiber is centered within the fiber support channel 250 at least substantially via the Bernoulli effect due to a fluid stream which is passing around the fiber and out of the fiber support channel 250 while the fiber is being drawn. Notably, such centering occurs without having to utilize any flow of fluid which would impinge upon the fiber from the side thereof, e.g., there are no jets of fluid flow employed which emanate from sidewalls of channel 250. The velocity of the fluid stream traveling through the slot is preferably adjusted to maintain the fiber so that the fiber is located entirely within a tapered region of the slot 250. In the presently described embodiment, because the fiber is located in an area of the channel 250 that is between about 1 and 2 times the fiber diameter, the fiber is supported by a pressure difference that exists below the fiber 214 (rather and as opposed to aerodynamic drag which might also be used to support a fiber, if one so chose). By supporting or levitating the fiber within channel 250 via a fluid pressure differential, much lower fluid flows can be employed than if aerodynamic drag was used to levitate the fiber.

In the embodiment illustrated, the fluid stream is preferably provided by a single fluid stream which enters fiber support channel 250 via the narrower inner portion of fiber support channel 250 and exits via the wider outer region of fiber support channel 250. In this way, the fiber can be positioned entirely within the slot formed by fiber support channel 250 such that the fiber floats between the narrowest and widest portion of the slot. By employing a tapered fiber support channel 250 and injecting the fluid flow through the region 250 in this manner, it is possible to retain the fiber in a region of said slot formed by fiber support channel 250 wherein the slot has a width which is between 10 to 150, more preferably 15 and 100, and most preferably between about 24-70 microns greater than the diameter of the fiber being directed through the fiber support channel 250. During the fiber draw process, the fiber is also preferably retained within a region of the channel such that the distance between the outer fiber and each wall is between 0.05 and 0.5 times the fiber diameter.

In some preferred embodiments, fiber support channel 250 is provided with a means for reducing pressure under the fiber as the fiber moves outwardly away from the source of the fluid flow. Such a means for releasing pressure can be achieved in the form of a tapered channel design, as described above. Additional means for reducing pressure are disclosed in U.S. Patent Application Ser. No. 60/861,587, the entire disclosure of which is hereby incorporated by reference in its entirety.

The fluid bearings described herein enable the optical fiber to travel along the region of fluid cushion so as to prevent or substantially prevent actual mechanical contact between the optical fiber and the bearing assembly, e.g., the fiber travels within fiber support channel 250 without contacting either of plates 230 or 232. In addition, because of the size and configuration of the region, the fluid bearing is capable of maintaining the fiber within the region without mechanical contact through a range of draw tensions without active control of the fluid flow.

Referring to FIG. 3, the fluid flow can be important to prevent the optical fiber 214 from moving towards the bottom of the fiber support channel 250 and coming in contact with the shim 237 or the sides of the fiber support channel 250. This is particularly important when the optical fiber is still bare so that the fiber quality is not compromised by the mechanical contact with the bearing assembly. Moreover, it is believed the closer the optical fiber 214 is positioned relative to the bottom of the fiber support channel 250, the higher the pressure needs to be within the fiber support channel 250 to maintain the optical fiber 214 at the desired location. As is evident, the taper in channel sides will cause the gaps between the channel sides and the fiber to be smaller, causing this necessary higher pressure.

Other factors influencing fiber position within fiber support channel 250 include the draw tension. For example, fiber pulled with 200 g of tension will float lower within fiber support channel 250 than fiber pulled with a tension of 100 g given the same fluid flow. As such, it is important that the fluid exiting the region of the fluid bearing be sufficient to maintain the optical fiber at the desired location for the particular fiber draw speed and draw tension employed.

For example, in an embodiment that utilizes a fiber support channel 250 having a width of about 127 microns at the innermost section between plates 230 and 232 and approximately 380 microns at the outermost section, the fluid flow rate can be from about 0.5 L/sec to more than 5 L/sec. Such a configuration and fluid flow can result in local fluid velocities around the optical fiber as high as 800 km/hour or even higher. Thus, in some embodiments the maximum fluid velocities around the fiber employed in the fiber support channel 250 are higher than 100, higher than 200, higher than 400, and possibly even higher than 600 km/hour. In some embodiments, maximum fluid velocities around the fiber employed in the fiber support channel 250 have been higher than 900 km/hour. For example, applicants have successfully employed 1000 km/hour fluid flow around the fiber in the fiber support channel 250. However, the methods disclosed herein are certainly not limited to these fluid velocities, and in fact the fluid velocity preferably can be chosen to result in the fiber being located at a desired location within fiber support channel 250, depending on draw conditions (e.g. draw speed, draw tension, etc.) and fluid bearing design. In another embodiment, the fluid flow rate can be from about 3 L/sec to about 4 L/sec. Of course, any fluid rate sufficient to maintain the optical fiber at the desired location at a given draw tension can be utilized. The use of such high fluid flow velocities can greatly facilitate cooling of the optical fiber. The larger the difference between the temperature of the fiber and the temperature of the fluid being emitted through the fluid bearing, and the higher the fluid flow velocity, the greater the amount of cooling that can be achieved. In some embodiments, the temperature of the fiber entering the fluid bearing can be greater than 100° C., greater than 500° C., greater than 1000° C., and even greater than 1500° C. higher than the temperature of the fluid being emitted through and supporting the fiber within the fluid bearing. Employing such temperature differentials in the embodiment discussed above, with an optical fiber draw speed of greater than 20 meters per second, a fiber having a temperature upon entry into the fluid bearing of 100° C. may be cooled as much as 1000° C., i.e., to about 100° C. using a room temperature (i.e., about 20° C.) fluid (preferably air) by passing the fiber through the fluid bearing to make the fiber achieve a 180 degree turn in direction. This very significant amount of cooling illustrates the capability of using fluid bearings such as are disclosed herein to cool the fiber greater than 50° C., 200° C., 500° C., 700° C., and even greater than 900° C. Perhaps even more significant is that such fiber cooling amounts can be achieved over fiber distance (i.e. the circumferential distance over which the fiber is exposed to the fluid cushion of the fluid bearing) of less than 3, more preferably less than 2, and most preferably less than 1 meter. However, greater or lesser distances of fiber/fluid cushion contact can be employed, depending on desired results and the layout of the manufacturing area. The significant cooling capability of the fluid bearings disclosed herein enables the potential elimination of helium cooling devices from the optical fiber draw process altogether.

The radius of the fluid bearings 116 is not critical. In some embodiments, fluid bearing is constructed to result in a fiber turn radius of from about 8 to 16 cm. Larger or smaller radius fluid bearings can be employed, or additional fluid bearings can be employed (such as is illustrated in FIG. 1) for example depending on whether greater cooling is desired (in which case larger radius fluid bearing may be preferred) or the constraints of the fiber draw process.

Embodiments of the present invention will now be described with reference to alternative embodiments of treatment zone (shown as 130 in FIG. 1).

Figure 4:
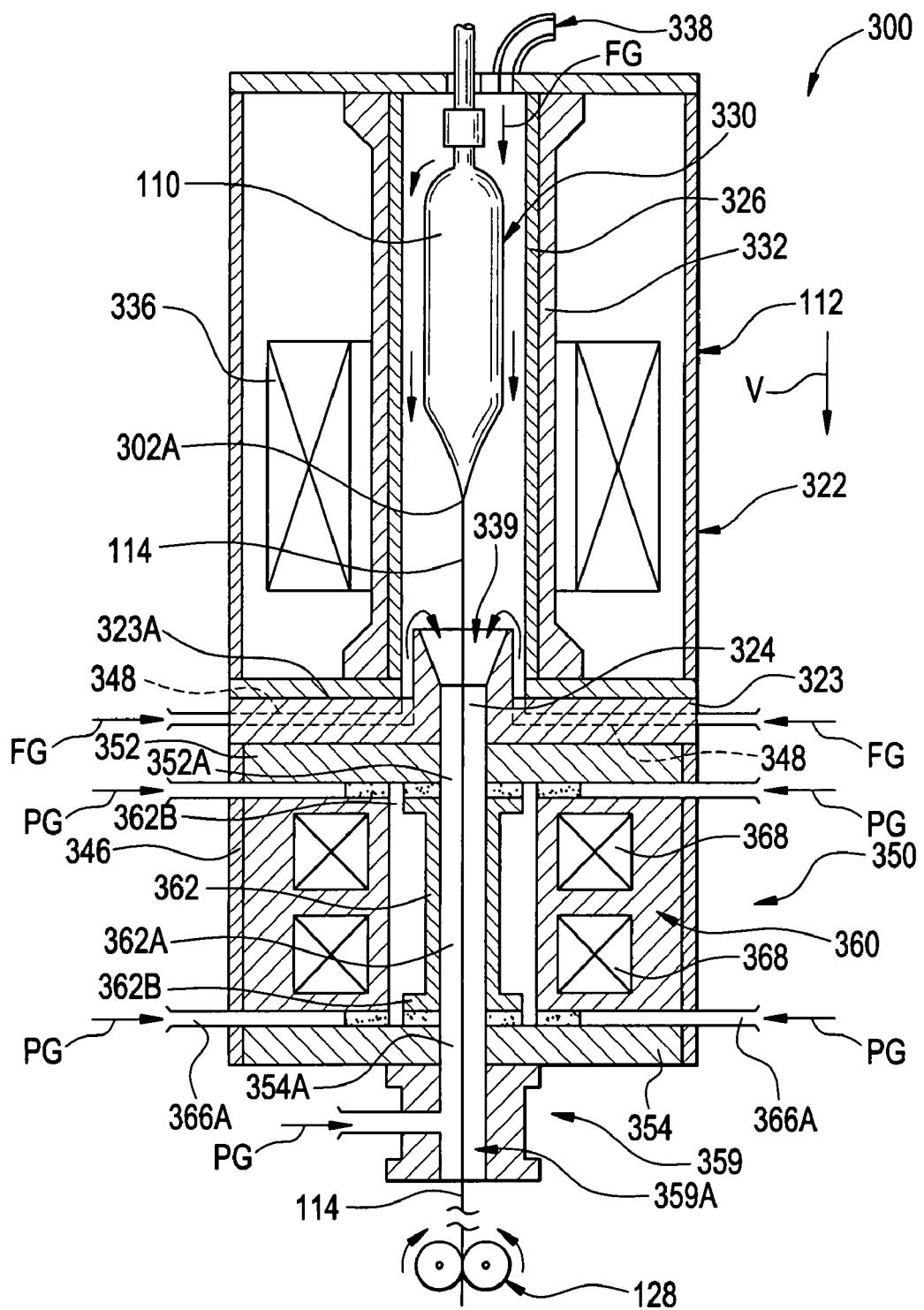
FIG. 4 is a schematic, cross-sectional side view of an optical fiber forming apparatus according to embodiments of the present invention.

FIG. 4, an optical fiber forming apparatus 300 includes, generally, a draw furnace 112, a treatment furnace 350 and a tensioning station 128, shown as a tractor assembly, for applying tension to the drawn fiber. The apparatus 300 may be used to treat a bare optical fiber 114 from a doped glass preform 110, for example. More particularly, the draw furnace 112 may be used to form a bare optical fiber 114 and the treatment furnace 350 may thereafter be used to treat the drawn fiber 114 to form a treated bare optical fiber 310A being treated so as to minimize the heat aging effect. The tensioning station 128 serves to control and maintain the desired tension in the fiber 114. Additional conventional process steps may be included, such as non-contact diameter measurement apparatus, further fiber cooling apparatus, fiber coating and curing apparatus for applying and curing the primary and secondary fiber coatings, and spool winding apparatus. Such additional process steps are conventional and not shown for clarity. Additionally, an iris or moveable door mechanism may be employed at the bottom of the treatment furnace to minimize the amount of air entry into the treatment furnace.

The glass preform 110 is preferably formed of a doped silica glass. The preform 110 may be formed such that either the core or the cladding (if present) of the drawn fiber is doped, or such that both the core and the cladding of the drawn fiber are doped. The silica glass may be doped with one or more of germanium, fluorine, phosphorous or chlorine, or combinations thereof, for example. Other suitable dopants may be used as well. Germanium doped fibers, were found by the inventors to exhibit heat aging under most manufacturing conditions. Methods and apparatus for forming the preform 110 are well known and are readily appreciated by those of skill in the art. Such methods include IVD, VAD, MCVD, OVD, PCVD and the like.

The draw furnace 112 preferably includes a housing 322 surrounding the preform and having a flange 323 secured on the lower end thereof, the flange 323 serving as the exit wall of the draw furnace 112. An axial opening 324 is defined in the flange 323 through which the fiber 114 passes and through which the previously dropped glass gob may pass. An annular sleeve-like susceptor 326 (which may be, for example, formed of graphite) extends through the draw furnace 112 and defines a passage 330 therein. The passage 330 includes an upper section adapted to receive and hold the optical fiber preform 110 and a lower section through which the drawn fiber 114 passes as glass is melted and drawn off from the preform 110. The gob, formed at the initiation of drawing also passes through this section. The lower section of the passage 330 communicates with the opening 324. A hollow exit cone 339 is preferably positioned over the opening 324. An annular insulator 332 and an induction coil(s) 336 surround the susceptor 326.

A suitable inert forming gas FG, such as helium, is introduced into the passage 330 at about 1 atmosphere of pressure through a suitable flow inlet 338 and flows downwardly and out of the draw furnace 112 through the opening 324. The draw furnace 112, as described and illustrated, is merely exemplary of suitable draw furnaces and it will be appreciated by those of skill in the art that draw furnaces of other designs and constructions, for example, using other types of heating mechanisms, susceptors and insulation, etc. may be employed.

With reference again to FIG. 4, opposed flow passages 348 extend radially through the flange 323 and terminate in openings at the upper surface 323A thereof. The passages 348 also extend vertically through the flange 323 and terminate adjacent the outer periphery of the cone 339. Forming gas FG is additionally fed through the openings of the passages 348 and flows up around the cone 339 and back down through the center opening of the cone 339. The forming gas FG may be, for example, helium gas (He), nitrogen gas ($N_2$), Argon gas (Ar), or any other suitable inert gas.

The treatment furnace 350 is positioned below, and preferably interconnected to, the flange 323. The treatment furnace 350 includes a heating unit 360 with one or more annular heating elements 368 therein. The heating element may be, for example, an electrical resistance or an induction heating coil. Openings 352A and 354A are defined in the upper and lower ends of treatment furnace 352 and 354, respectively. The openings along the draw path are sufficiently large to enable the glass gob to drop through upon initiation of draw. The ends 352, 354 and the sleeve 346 serve as the housing for the treatment furnace 350. However, it will be appreciated that other housing configurations and components may be employed. The treatment furnace 350 is preferably secured to flange 323 of the draw furnace 112 by suitable means such as fasteners.

A generally cylindrical spool or tube 362 is disposed in the heating unit 360. The spool or tube 362, which can be made up from a substantially pure silica quartz glass, ceramic, and/or carbon material, defines a passage 362A and has a pair of flanges (i.e., quartz flanges) 362B located on opposed ends thereof. The flanges 362B may be, for example, flame welded to the ends of a tube to form the spool 362. A first graphite gasket 364 is interposed between the lower surface of the flange 352 and the upper flange 362B. A second graphite gasket 364 is interposed between the lower flange 354 and the lower flange 362B.

Gas rings 366 having feed passages 366A surround the graphite gaskets 364 and have small perforations adapted to direct a purge gas PG toward the graphite gaskets 364. The purge gas PG is provided to reduce or prevent exposure of the graphite gaskets 364 to air and may be, for example, helium (He), Argon (Ar), nitrogen ($N_2$), or any other suitable inert gas.

A purge gas member 359 is affixed to the lower surface of the flange 354. A purge gas PG is pumped into the purge tube passage 359A to prevent air from entering the passage 362A from below.

The passage 362A of the tube 362 preferably has a diameter dimension D of greater than 12 mm at all places along its length, and preferably between about 12 mm and 80 mm, and more preferably between 45 mm and 80 mm to allow the glass gob formed at the initiation of drawing to readily drop therethrough. The length L of the treatment zone of the treatment furnace 350 extending between the upper surface of the flange 352 and the lower surface of the flange 354 is preferably between about 2.5 m and 10 m, and more preferably between about 3.5 m and 8.5 m, such as between about 5.0 m and 7.5 m. The preferred length L will depend on the draw speed of the fiber 114 and examples of ranges of a draw speed are from about 5 m/s to about 45 m/s, such as from about 10 m/s to 35 m/s, including from about 15 m/s to 25 m/s. The presence of fluid bearings 116 (as shown in FIG. 1), downstream from optical fiber forming apparatus 300 enables the treatment zone to have a longer length, such as a treatment zone having a length of at least 5 meters, including a treatment zone having a length of at least 7.5 meters, and further including a treatment zone having a length of at least 10 meters.

Preferably, the overall system for forming the optical fiber is housed in an area protected from outside elements, such as a building or factory having a roof height of between about 6 and 15 meters, such as a roof height of between about 9 and 11 meters. In at least one embodiment, the length L of treatment zone can extend at least 50% of the vertical height of the overall system, including at least 60% of the vertical height of the overall system, and further including at least 70% of the vertical height of the overall system, and even further including at least 80% of the vertical height of the overall system. In addition, the length L of the treatment zone can extend at least 50% of the vertical distance between the roof and the floor of a building or factory in which the overall system is housed, including at least 60% of the vertical distance between the roof and the floor of a building or factory in which the overall system is housed, and further including at least 70% of the vertical distance between the roof and the floor of a building or factory in which the overall system is housed, and even further including at least 80% of the vertical distance between the roof and the floor of a building or factory in which the overall system is housed.

The tensioning station 128 may be any suitable device for controlling the tension in the drawn fiber 114. Preferably, the tensioning device 370 includes a microprocessor which continuously receives input from one or more fiber tension and/or diameter sensors (not shown) and is operative to apply the tension of the fiber 114 as needed. In a preferred embodiment, the tension commanded is based upon controlling the diameter to equal a set diameter stored in memory.

The apparatus 300 may be used in the following manner to manufacture a treated optical fiber 114. The furnace induction coil 336 is operated to heat the tip 302A of the optical fiber preform 110 to a preselected draw temperature $T_D$. Preferably, the draw temperature $T_D$ is in the range of between about 1,800° C. and 2,200° C. More preferably, the draw temperature $T_D$ is in the range of between about 1,900° C. and 2,050° C. The preform tip 302A is maintained at the selected draw temperature $T_D$ so that the drawn fiber 114 is continuously drawn off of the tip 302A in a draw direction V, which is preferably vertically downward. The fiber 114 is maintained at a calculated draw tension $F_D$ as described above by the tensioning device 370 or other suitable tension applying apparatus such that the set diameter (typically 125 μm) of the fiber is met within a predefined tolerance band. The forming gas FG (e.g., helium) is pumped from the upper inlet 338 and through the passages 330, 324, 352A, 362A, 354A and out through the purge tube passage 359A.

In this way, the drawn fiber 114 is drawn off from the preform 110 at a selected draw speed $S_D$ as described above. The selected draw temperature $T_D$ and the draw tension $F_D$ used to manufacture the fiber causes the fiber 114 to have the undesirable heat aging defect. That is, as a result of the draw temperature $T_D$ and the draw tension $F_D$ used to draw the fiber 114 at the desired speed $S_D$, the drawn fiber 114 will exhibit a sensitivity to heat aging.

Because the treatment device 350 is secured substantially immediately adjacent the opening 324 of the draw furnace 320, the drawn fiber 114 is not quenched by cooler ambient air as the fiber 114 exits the draw furnace 320. Further, the possibility of oxygen getting into the draw furnace is reduced, thereby minimizing possible degradation of the graphite susceptor 326. In the bare optical fiber 114 passes through the passage 324 and is substantially immediately heated by the heating unit 360. The heating unit 360 maintains the temperature of the fiber 114 at a treatment temperature $T_T$ within a selected temperature range $T_1$ to $T_2$. The lower temperature $T_1$ is preferably between about 1,100° C. and 1,400° C. and the upper temperature $T_2$ is preferably between about 1,200° C. and 1,800° C. More preferably, the lower temperature $T_1$ is between about 1,200° C. and 1,350° C. and the upper temperature $T_2$ is between about 1,300° C. and 1,450° C. Also, as the fiber 114 passes through the passage 362A, the fiber 114 is maintained at a selected treatment tension $F_T$. Preferably, the treatment tension $F_T$ is between about 25 and 200 grams.

More preferably, the treatment tension $F_T$ is between about 90 and 170 grams. The length L of the treatment zone is selected such that the drawn fiber 114 is maintained within the selected temperature range $T_1$ to $T_2$ for a selected resident treatment time $t_T$. The treated fiber 114 exits the treatment furnace 350 through the bottom opening 354A and preferably continues downwardly to additional processing stations (additional cooling, measurement, coating, etc.).

The above-described treatment temperature $T_T$, treatment tension $F_T$ and resident time $t_T$ are cooperatively selected to reduce or eliminate the heat aging defect or sensitivity in the fiber 114. Accordingly, the treated fiber 114 so formed will have a lesser heat aging defect or sensitivity as compared to an optical fiber which has not been suitably treated in the manner described above, but which has otherwise been formed in the same manner. The foregoing methods and apparatus thus allow for relatively high speed drawing of optical fiber with reduced heat aging defects as compared to untreated fibers drawn at the same speed.

Preferably, the draw furnace 112 and the treatment furnace 350 are relatively configured and secured and the gases are supplied such that they provide an air-tight path from the passage 330 to the opening 359A.

In a preferred embodiment, the treatment furnace 350 includes a plurality of individual heaters spaced along the axial length of the treatment furnace 350. Each of the heaters encircles the fiber, and each is preferably individually controlled by a controller. During the step of heat treating, the fiber is subjected to heat from multiple heating zones; at least one of the heating zones (each zone roughly corresponding to the physical size of the heaters) of the multiple heating zones is set to different temperature as compared to another of the multiple heating zones. Preferably, the temperature of the wall of each heater is controlled by a controller such that at least one of the heating zones has a passage temperature of between 1,400° C. and 1,600° C. In a preferred mode of operation, a first zone closer to the draw furnace 112 is controlled to have a passage temperature at its center of between 1,100° C. and 1,300° C., while a second zone further away from the draw furnace is controlled to have a passage temperature of between 1,400° C. and 1,500° C. The actual wall temperatures will be set such that the desired fiber exit surface temperature condition is achieved to provide the desired cooling rate. If the gas used is other than helium, for example, the wall temperature would be set to a lower temperature because the thermal conductivity of Argon and mixtures of Argon and Helium would have a lower coefficient of thermal conductivity and, therefore, more of a temperature difference is required between the furnace's passage temperature and the fiber temperature to achieve the same cooling rate.

In at least one preferred embodiment, the heating elements of the treatment furnace are preferably molydisilicide high temperature heating elements available from Kanthal.

Figure 5:
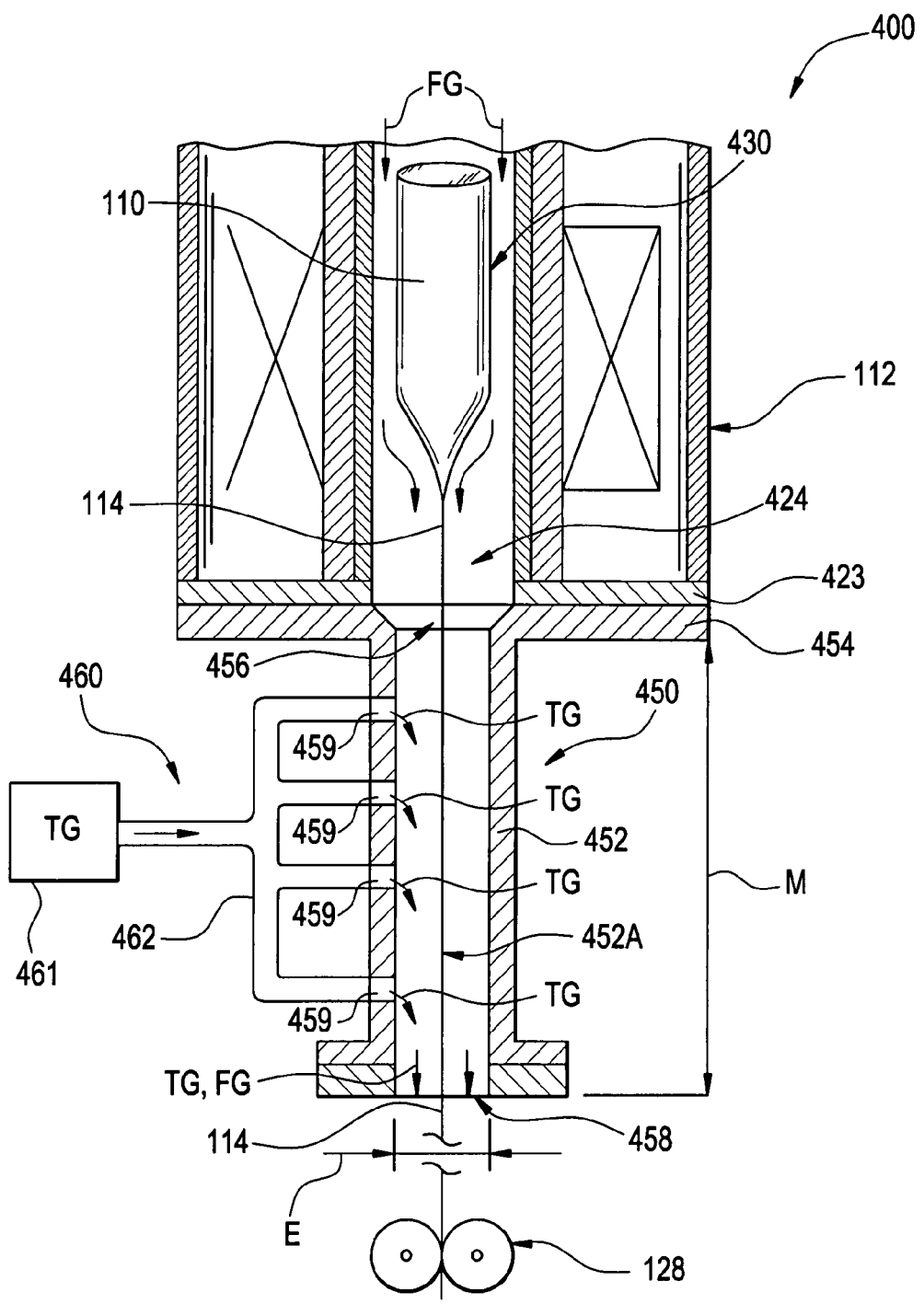
FIG. 5 is a schematic, cross-sectional side view of an optical fiber forming apparatus according to further embodiments of the present invention.

FIG. 5, an optical fiber forming apparatus 400 includes a draw furnace 112 corresponding to the draw furnace 112. In place of the treatment furnace 350, the apparatus 400 includes a passive treatment assembly 450. The assembly 450 is "passive" in that it does not include a heating device corresponding to the heating module 360 in any portion thereof. In other words, the fiber is cooled at a controlled rate without the aid of an active heating module.

The apparatus 400 includes a draw furnace 112 and a tensioning station 128 corresponding to the draw furnace 112 and the tensioning station 128, respectively. Preferably, the draw furnace 112 is of the type having a graphite susceptor. The passive treatment assembly 450 includes a tubular muffle 452 having an upper flange 454. The muffle 452 is affixed directly to the lower end wall 423 of the furnace 112 by bolts or other fasteners (not shown for clarity) that extend through holes in the flange 454 and engage the end wall 423. The muffle 452 is preferably formed of metal, such as stainless steel or aluminum.

The muffle 452 defines an upper opening 456 at a first end, an opposing lower opening 458 at a second end and a passage 452A extending therebetween. Preferably, the diameter E of the passage 452A is substantially uniform and greater than 12 mm, more preferably between about 12 mm and 80 mm, and most preferably between 45 and 80 mm. The upper opening 456 communicates with the lower opening 424 of the draw furnace 112. A plurality of axially spaced supply ports 459 are formed in the side wall of the muffle 452 and communicate with the passage 452A along its length.

A treatment gas flow system 460 is operatively and fluidly connected to the muffle 452. The treatment gas flow system 460 includes a treatment gas supply 461 that is fluidly and operatively connected to each of the ports 459 by a manifold or conduits 462. The treatment gas supply station 461 includes a supply of a selected treatment gas TG, and a pump or the like operative to pressurize the treatment gas TG sufficiently to force it through the conduits 462 and the feed ports 459 and into the passage 452A. The treatment gas supply station 461 may optionally include a heating unit to heat the treatment gas TG. However, preferably the treatment gas is supplied at about 20° C.

The apparatus 400 may be used in the following manner to form a treated optical fiber 114. Using the draw furnace 112 and the tensioning station 128, a bare optical fiber 114 is drawn from a preform 110 in the manner described above with regard to the apparatus 300, at a draw temperature and a draw tension sufficient to introduce a heat aging defect. As the fiber 114 is being drawn, a forming gas FG is introduced through an inlet identical to that shown in FIG. 4. The forming gas flows through the passage 430 about the preform 110 and the fiber 114, through the opening 424 in the furnace end wall 423 and into the first end of the passage 452A through the opening 456.

The drawn fiber 114 enters the passage 452A of the muffle 452 immediately upon exiting the furnace 112. As the fiber 114 passes through the passage 452A, the treatment gas TG is pumped from the treatment gas supply 461 into the passage 452A through the at least two axially spaced supply ports 459 as indicated by the arrows in FIG. 5. The treatment gas flows into the passage 452A at the various stages and mixes with the forming gas FG. Preferably, the treatment gas TG has a thermal conductivity k of less than about $120 \times 10^{-6}$ cal/(sec) $(cm)^2$ (° C./cm), and more preferably less than about $65 \times 10^{-6}$ cal/(sec) $(cm)^2$ (° C./cm) at 25° C. The mixture of the treatment gas TG and the forming gas FG flows through the passage 452A and exits through the second end opening 458.

The treatment gas TG has a lower thermal conductivity than the forming gas FG. Preferably, the thermal conductivity of the treatment gas TG is less than 40% of, and more preferably less than 20% of, the thermal conductivity of the forming gas FG. The treatment gas TG is preferably nitrogen or argon, but could also include krypton or xenon.

As the drawn fiber 114 is drawn through passage 452A, the drawn fiber 114 is maintained at the selected treatment tension $F_T$, and the treatment temperature $T_T$ of the fiber 114 while in the passage 452A is maintained in the selected temperature range $T_1$-$T_2$ for the selected residence time $t_T$ as discussed above with respect to the apparatus 300. In the manner described above with respect to the apparatus 300, the selected treatment tension $F_T$, temperature range $T_1$ to $T_2$ and residence time $t_T$ are cooperatively selected such that they reduce or eliminate the heat aging defect in the fiber 114, thereby providing a treated bare optical fiber 114. In the case of the apparatus 400, the length M of the passage 452A of the passive treatment device 450 is selected to provide the desired residence time $t_T$ in view of the draw speed of the fiber 114.

The lower thermal conductivity of the treatment gas TG slows heat transfer from or cooling of the drawn fiber 114 so that the fiber 114 is maintained in the selected temperature range $T_1$-$T_2$ while in the passage 452A. The flow rate, turbulence and temperature of the treatment gas TG may be selected as appropriate to provide the desired cooling rate. In accordance with this embodiment of the invention, the desired cooling rate in the treatment zone may be between 1,000° C./sec and 3,500° C./sec in a temperature range of between 1,200° C. to 1,500° C. The presence of fluid bearings 116 (as shown in FIG. 1), downstream from optical fiber forming apparatus 400 enables the treatment zone to have a longer length, such as a treatment zone having a length of at least 5 meters, including a treatment zone having a length of at least 7.5 meters, and further including a treatment zone having a length of at least 10 meters.

Figure 6:
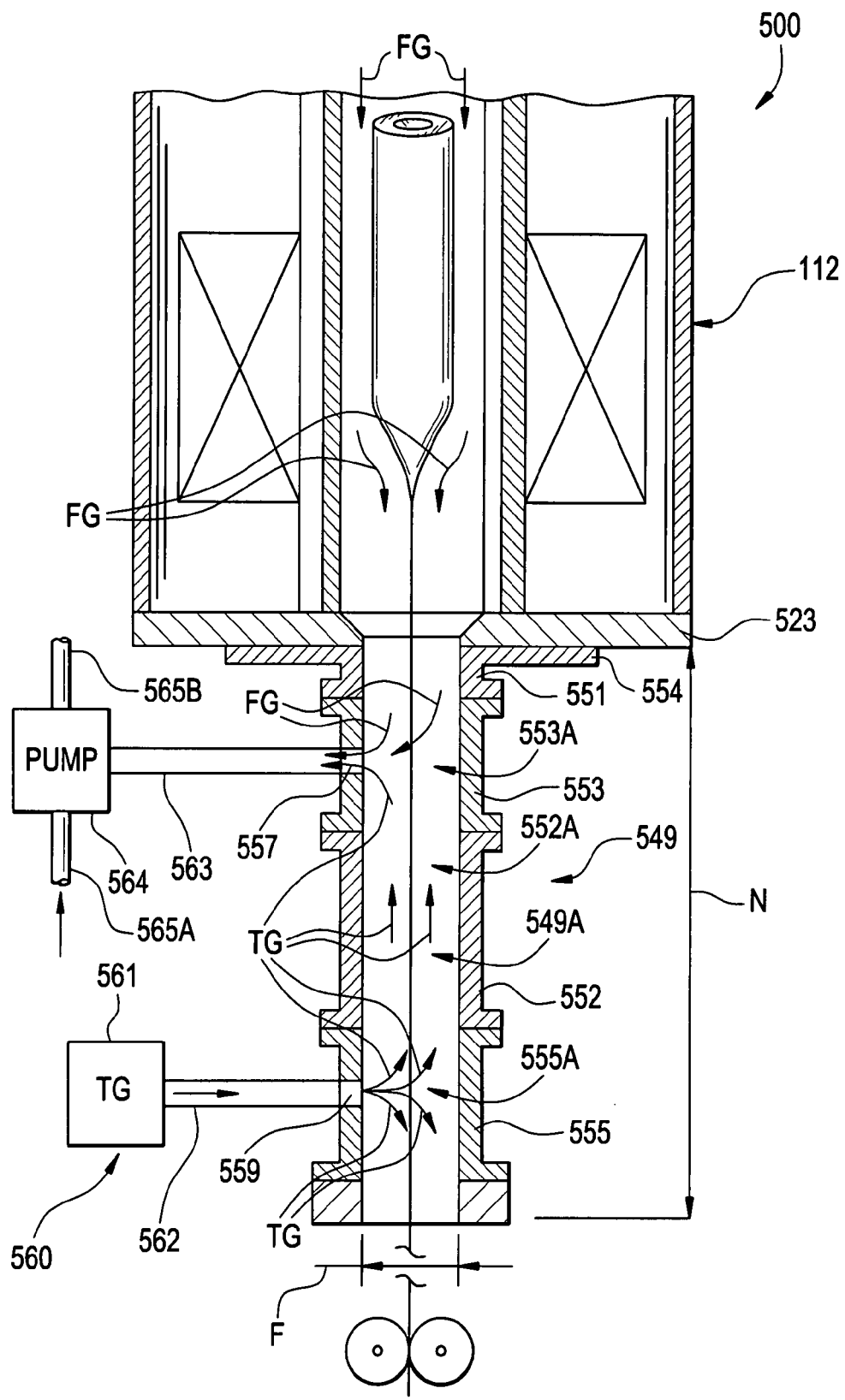
FIG. 6 is a schematic, cross-sectional side view of an optical fiber forming apparatus according to further embodiments of the present invention.

FIG. 6, an optical fiber forming apparatus 500 according to further embodiments of the present invention is shown therein. The apparatus 500 includes a draw furnace 112 of the type having a graphite susceptor. The apparatus 500 corresponds to the apparatus 400 except as follows and may be used in the same manner except as follows.

The muffle 450 is replaced with a multi-piece muffle assembly 549 defining a continuous passage 549A. The muffle assembly 549 includes an annular upper muffle section 551 including a flange 554 for securing the muffle assembly 549 to the exit wall 523 of the draw furnace 112. A second annular muffle section 553 is affixed to the lower end of the muffle section 551 and defines a passage 553A. An outlet port 557 is formed in the side of the muffle 553 and communicates with the passage 553A. A third annular muffle section 552 is affixed to the lower end of the muffle section 553 and defines a passage 552A. A fourth annular muffle section 555 is fixed to the lower end of the muffle section 552 and defines a passage 555A. A feed port 559 is formed in the muffle 555 and communicates with the passage 555A. The diameter F of the passage 549A is preferably substantially uniform and preferably greater than 12 mm, more preferably between about 12 mm and 80 mm, and most preferably between 45 and 80 mm and is preferably of substantially constant diameter along its length N. The length N of the muffle assembly 549 is preferably between about 2.5 m and 10 m, and more preferably between about 3.5 m and 8.5 m, such as between about 5.0 m and 7.5 m. The presence of fluid bearings 116 (as shown in FIG. 1), downstream from optical fiber forming apparatus 500 enables the treatment zone to have a longer length, such as a treatment zone having a length of at least 5 meters, including a treatment zone having a length of at least 7.5 meters, and further including a treatment zone having a length of at least 10 meters.

Additionally, in the apparatus 500, the treatment gas flow apparatus 460 is replaced with a treatment gas flow system 560. The flow system 560 includes a treatment gas supply 561 corresponding to the treatment gas supply station 561. The treatment gas supply station 561 is fluidly connected to the feed port 559 by a conduit 562. The flow system 560 further includes a pump 564 fluidly connected to the outlet port 557 by a conduit 563. The pump 564 is preferably a Venturi pump that is provided with a supply of compressed air from inlet 565A as illustrated.

In use, the treatment gas TG is introduced from the treatment gas supply 561 through the conduit 562 and the feed port 559 into the passage 555A. The pump 564 provides a sufficient vacuum and resultantly draws at least a portion of the treatment gas TG up through the passages 552A and 553A, through the outlet port 557 and the conduit 563, and out through an outlet 565B. Simultaneously, the vacuum generated by the pump 564 draws the forming gas FG from the draw furnace 112 through the passage 553A, the outlet port 557 and the conduit 563, and out through the pump outlet 565B as well. This is beneficial, because it prevents the mixing of the two gasses in the lower end of the passage 549A.

In operation, methods in accordance with embodiments of the invention can comprise the steps of drawing the optical fiber from a heated glass supply, such as an optical fiber preform at a draw rate of greater than or equal to 10 m/s, preferably greater than or equal to 20 m/s, including greater than or equal to 30 m/s, followed by treating the optical fiber by maintaining the optical fiber in a treatment zone for a residence time, which in at least one embodiment can be greater than 0.05 seconds and less than 0.25 seconds, and in other embodiments can be at least 0.25 seconds (such as from 0.25 seconds to 0.5 seconds) while subjecting the optical fiber to an average cooling rate in the treatment zone of greater than 500° C./s and less than 5,000° C./s, and in some embodiments greater than 500° C./s and less than 2,500° C./s, and in further embodiments, greater than 500° C./s and less than 1,000° C./s, wherein the length of the treatment zone is at least 3.5 meters, such as at least 5 meters, including at least 7.5 meters, and further including at least 10 meters.

In a preferred embodiment, the optical fiber is a single mode step index fiber having a germanium dopant in the central core and a substantially pure silica cladding. However, it should be recognized that the method described herein is equally useful and adapted for treating any optical fiber having a germanium-doped central core. Preferably, the germanium is present in the core in a sufficient amount to provide a relative refractive index percent of at least 0.3% as compared to the cladding. The fiber is preferably drawn by heating the preform to a flowing consistency (1,800-2,200° C.) at its draw root and applying a draw tension to the coated optical fiber by using a tensioning apparatus set to provide a tension of between about 25 grams to about 200 grams; more preferably between about 60 and 170 grams; and most preferably about 90-150 grams. Drawing at high speed and tension enables production of large volumes of the optical fiber which is then treated in accordance with aspects of the present invention to further minimize the attenuation of the produced fiber as compared to untreated fiber.

In accordance with embodiments of the invention, it is preferable to configure and locate the treatment zone to provide a fiber entry surface temperature of the optical fiber, as it enters the treatment zone of between 1,300° C. and 2,000° C.; more preferably between 1,550° C. and 1,750° C.; and in some embodiments, greater than 1,600° C. Preferably also, it is desired to configure the length and operating parameters of the treatment zone to provide an exit surface temperature of the optical fiber at an exit of the treatment zone of at least about 1,100° C., such as between 1,250° C. and 1,450° C.; more preferably between 1,300° C. and 1,450° C.; and most preferably between 1,325° C. and 1,425° C.

EXAMPLES

The invention will be further clarified by the following examples.

Examples 1-12

Examples 1-12, representing various embodiments of the present invention, are set forth in Table 1. These examples show the treatment of optical fiber through a treatment zone having the indicated length L in meters, the indicated draw speed of the optical fiber through the treatment zone in meters per second, the indicated fiber surface temperature upon entry of the fiber into the treatment zone in ° C., the indicated fiber surface temperature upon exit of the fiber from the treatment zone in ° C., and the calculated average cooling rate of the fiber while in the treatment zone in ° C. per second.

TABLE 1

| Example | Treatment Zone Length (meters) | Fiber Draw Speed (m/s) | Fiber Entry Surface Temperature (° C.) | Fiber Exit Surface Temperature (° C.) | Average Cooling Rate in Treatment Zone (° C./s) |
|---|---|---|---|---|---|
| 1 | 5 | 10 | 1750 | 1250 | 1000 |
| 2 | 5 | 10 | 1650 | 1350 | 600 |
| 3 | 5 | 20 | 1750 | 1250 | 2000 |
| 4 | 5 | 20 | 1650 | 1350 | 1200 |
| 5 | 5 | 30 | 1750 | 1250 | 3000 |
| 6 | 5 | 30 | 1650 | 1350 | 1800 |
| 7 | 7.5 | 15 | 1750 | 1250 | 1000 |
| 8 | 7.5 | 15 | 1650 | 1350 | 600 |
| 9 | 7.5 | 25 | 1750 | 1250 | 1667 |
| 10 | 7.5 | 25 | 1650 | 1350 | 1000 |
| 11 | 7.5 | 35 | 1750 | 1250 | 2333 |
| 12 | 7.5 | 35 | 1650 | 1350 | 1400 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for producing an optical fiber, said method comprising:
   drawing the fiber from a heated glass source, and
   treating the optical fiber by maintaining the optical fiber in a treatment zone, wherein the length of the treatment zone is at least about 5 meters, while subjecting the optical fiber to an average cooling rate in the treatment zone defined as a fiber entry surface temperature minus a fiber exit surface temperature divided by the total residence time of the optical fiber in the treatment zone of less than 5,000° C./s, wherein the surface temperature of the optical fiber exiting the treatment zone is at least about 1,000° C. and wherein the steps of drawing the fiber from a heated glass source and treating the fiber in a treatment zone occur along a first pathway and the method further comprises:
   contacting the bare optical fiber with a region of fluid in a fluid bearing, said fluid bearing comprising a channel, said channel defined by at least two sidewalls, the fiber being retained between said two sidewalls during said drawing step, said two sidewalls defining an inlet below said fiber, said fiber positioned more than a fiber diameter from said inlet, causing said fiber to be levitated within the channel substantially as a result of a pressure differential which is present below the fiber within the channel, said pressure differential caused by a higher pressure caused by said fluid being supplied below the fiber within the channel compared to the pressure which is present above the fiber, and
   redirecting the fiber along a second pathway as said bare optical fiber is drawn across said region of fluid cushion.

2. The method of claim 1, wherein the total residence time of the fiber in the treatment zone is greater than 0.25 seconds.

3. The method of claim 1, wherein the average cooling rate of the fiber in the treatment zone is less than 2,500° C./s.

4. The method of claim 3, wherein the average cooling rate of the fiber in the treatment zone is less than 1,000° C./s.

5. The method of claim 1, wherein the surface temperature of the optical fiber entering the treatment zone is between about 1,550° C. and about 1,750° C. and the surface temperature of the optical fiber exiting the treatment zone is from about 1,250° C. to about 1,450° C.

6. The method of claim 1, wherein the fiber is drawn at a draw speed of greater than or equal to 30 m/s.

7. A method for producing an optical fiber, said method comprising:
   drawing the fiber from a heated glass source at a draw rate of greater than or equal to 30 m/s, and
   treating the optical fiber by maintaining the optical fiber in a treatment zone for a total residence time of greater than 0.25 seconds, while subjecting the optical fiber to an average cooling rate in the treatment zone defined as a fiber entry surface temperature minus a fiber exit surface temperature divided by the total residence time of the optical fiber in the treatment zone of less than 5,000° C./s, wherein the surface temperature of the optical fiber exiting the treatment zone is at least about 1,000° C. and wherein the steps of drawing the fiber from a heated glass source and treating the fiber in a treatment zone occur along a first pathway and the method further comprises:
   contacting the bare optical fiber with a region of fluid in a fluid bearing, said fluid bearing comprising a channel, said channel defined by at least two sidewalls, the fiber being retained between said two sidewalls during said drawing step, said two sidewalls defining an inlet below said fiber, said fiber positioned more than a fiber diameter from said inlet, causing said fiber to be levitated within the channel substantially as a result of a pressure differential which is present below the fiber within the channel, said pressure differential caused by a higher pressure caused by said fluid being supplied below the fiber within the channel compared to the pressure which is present above the fiber, and
   redirecting the fiber along a second pathway as said bare optical fiber is drawn across said region of fluid cushion.

8. The method of claim 7, wherein the average cooling rate of the fiber in the treatment zone is less than 2,500° C./s.

9. The method of claim 8, wherein the average cooling rate of the fiber in the treatment zone is less than 1,000° C./s.

10. The method of claim 7, wherein the surface temperature of the optical fiber entering the treatment zone is between about 1,550° C. and about 1,750° C. and the surface temperature of the optical fiber exiting the treatment zone is from about 1,250° C. to about 1,450° C.

11. A method for producing an optical fiber, said method comprising:
    drawing the fiber from a heated glass source and treating the optical fiber by maintaining the optical fiber in a treatment zone, wherein the length of the treatment zone is at least about 5 meters, wherein the surface temperature of the optical fiber entering the treatment zone is from about 1,300° C. to about 2,000° C. and the surface temperature of the optical fiber exiting the treatment zone is at least about 1,000° C.;
    wherein the steps of drawing the fiber from a heated glass source and treating the fiber in a treatment zone occur along a first pathway and the method further comprises:

contacting the bare optical fiber with a region of fluid in a fluid bearing, said fluid bearing comprising a channel, said channel defined by at least two sidewalls, the fiber being retained between said two sidewalls during said drawing step, said two sidewalls defining an inlet below said fiber, said fiber positioned more than a fiber diameter from said inlet, causing said fiber to be levitated within the channel substantially as a result of a pressure differential which is present below the fiber within the channel, said pressure differential caused by a higher pressure caused by said fluid being supplied below the fiber within the channel compared to the pressure which is present above the fiber, and redirecting the fiber along a second pathway as said bare optical fiber is drawn across said region of fluid cushion.

12. The method of claim 11, wherein the surface temperature of the optical fiber entering the treatment zone is from about 1,550° C. to about 1,750° C. and the surface temperature of the optical fiber exiting the treatment zone is between about 1,250° C. and about 1,450° C.

13. The method of claim 11, wherein the fiber is drawn at a draw speed of greater than or equal to 30 m/s.

* * * * *